United States Patent
Hine et al.

(10) Patent No.: US 10,640,180 B2
(45) Date of Patent: May 5, 2020

(54) WATER VEHICLES

(71) Applicant: Liquid Robotics, Inc., Sunnyvale, CA (US)

(72) Inventors: Roger G. Hine, Sunnyvale, CA (US); Derek L. Hine, Sunnyvale, CA (US)

(73) Assignee: LIQUID ROBOTICS, INC., Sunnyvale, CA (US)

( * ) Notice: Subject to any disclaimer, the term of this patent is extended or adjusted under 35 U.S.C. 154(b) by 582 days.

(21) Appl. No.: 14/775,489

(22) PCT Filed: Mar. 5, 2014

(86) PCT No.: PCT/US2014/020853
§ 371 (c)(1),
(2) Date: Sep. 11, 2015

(87) PCT Pub. No.: WO2014/158914
PCT Pub. Date: Oct. 2, 2014

(65) Prior Publication Data
US 2016/0023725 A1    Jan. 28, 2016

Related U.S. Application Data

(63) Continuation of application No. 13/831,058, filed on Mar. 14, 2013, now abandoned.

(51) Int. Cl.
*B63B 35/50* (2006.01)
*B63H 19/02* (2006.01)
(Continued)

(52) U.S. Cl.
CPC .............. *B63B 35/50* (2013.01); *B63B 35/00* (2013.01); *B63H 19/02* (2013.01); *B64C 19/00* (2013.01);
(Continued)

(58) Field of Classification Search
CPC .............. B64C 19/00; B64C 2201/141; B64C 2201/201; B64C 2201/102;
(Continued)

(56) References Cited

U.S. PATENT DOCUMENTS 3,084,652 A * 4/1963 Lager ................... B64D 25/20
114/20.1
3,123,842 A * 3/1964 Oeland et al. .......... B63B 22/12
116/210
(Continued)

FOREIGN PATENT DOCUMENTS

CN          202208367       5/2012
KR      10-2008-0086543     9/2008

OTHER PUBLICATIONS

Owen R. Cote, Jr., 'The Future of the Trident Force', May 2002, https://www.files.ethz.ch/isn/20105/Trident_Force.pdf.*
(Continued)

*Primary Examiner* — Christopher D Hutchens
(74) *Attorney, Agent, or Firm* — Gates & Cooper LLP

(57) ABSTRACT

Equipment and methods that combine the use of wave powered vehicles and unmanned aerial vehicles (UAVs or drones). A UAV can be launched from a wave-powered vehicle, observe another vessel, and report the results of its observation to the wave-powered vehicle, and the wave-powered vehicle can report the results of the observation to a remote location. The UAV can land on water and can then be recovered by the wave-powered vehicle.

22 Claims, 4 Drawing Sheets

(51) Int. Cl.
  *B64C 39/02*    (2006.01)
  *B64F 1/04*     (2006.01)
  *B64F 1/22*     (2006.01)
  *B63B 35/00*    (2020.01)
  *B64C 19/00*    (2006.01)

(52) U.S. Cl.
  CPC .............. *B64C 39/024* (2013.01); *B64F 1/04* (2013.01); *B64F 1/221* (2013.01); *B64C 2201/021* (2013.01); *B64C 2201/08* (2013.01); *B64C 2201/084* (2013.01); *B64C 2201/102* (2013.01); *B64C 2201/141* (2013.01); *B64C 2201/201* (2013.01); *B64C 2201/205* (2013.01); *Y02T 70/59* (2013.01)

(58) Field of Classification Search
  CPC ........ B64C 2201/084; B64C 2201/021; B64C 2201/205; B64C 1/062; B64C 2201/08; B64C 2201/127; B63B 35/52; B63B 35/50; B63B 21/58; B63B 21/66; B63B 2205/08; B63B 2205/06; B63B 2205/005; B63B 2205/007; B63B 2021/004; B63G 11/00
  See application file for complete search history.

(56) References Cited

U.S. PATENT DOCUMENTS

| | | | |
|---|---|---|---|
| 3,341,871 A | 9/1967 | Oliveau | |
| 4,185,864 A * | 1/1980 | Phillips | B66C 1/34 294/66.1 |
| 4,242,978 A * | 1/1981 | Fuller | B63B 21/56 114/253 |
| 4,684,350 A * | 8/1987 | DeLima | B63H 19/02 440/9 |
| 5,241,920 A * | 9/1993 | Richardson | B63B 21/66 114/221 R |
| 6,142,421 A * | 11/2000 | Palmer | B64C 39/024 220/4.13 |
| 6,392,213 B1 * | 5/2002 | Martorana | B64C 39/024 244/13 |
| 7,025,014 B1 * | 4/2006 | Forgach | B63B 21/66 114/244 |
| 7,097,136 B2 | 8/2006 | Ruszkowski, Jr. | |
| 7,264,204 B1 | 9/2007 | Portmann | |
| 2005/0230535 A1 * | 10/2005 | Ruszkowski, Jr. | B63G 8/28 244/105 |
| 2005/0230536 A1 * | 10/2005 | Dennis | B64C 39/024 244/110 C |
| 2012/0138727 A1 * | 6/2012 | Fisher | B64C 39/024 244/3.15 |
| 2012/0290164 A1 * | 11/2012 | Hanson | B60F 5/00 701/23 |
| 2014/0377004 A1 * | 12/2014 | Lossec | B63B 23/40 405/3 |

OTHER PUBLICATIONS

Chinese Office Action dated Aug. 2, 2017 for CN Patent Application No. 201480015227.1.
Chinese Office Action (with English translation) dated Dec. 4, 2017 for Chinese Patent Application No. 201480015227.1.
Chinese Office Action (with English translation) dated Apr. 8, 2018 for Chinese Patent Application No. 201480015227.1.
Korean Office Action (with English translation) dated Feb. 21, 2020 for Korean Patent Application No. 10-2015-7029113.

* cited by examiner

WATER VEHICLES

CROSS REFERENCE TO RELATED APPLICATIONS

This application is related to the following U.S. and International patents and patent applications
U.S. patent application Ser. No. 11/436,447, filed May 18, 2006, now U.S. Pat. No. 7,371,136,
U.S. patent application Ser. No. 12/082,513, now U.S. Pat. No. 7,641,524,
International Patent Application No. PCT/US 07/01139, filed Jan. 18, 2007, published Aug. 2, 2007, as WO 2007/087197, issued Oct. 25, 2011 as U.S. Pat. No. 8,043,133,
International Patent Application No. PCT/US 2008/002703, filed Feb. 29, 2008, published Sep. 12, 2008, as WO 2008/109002, issued Nov. 3, 2014 as U.S. Pat. No. 8,668,534
U.S. patent application Ser. No. 13/424,156, filed Mar. 19, 2012, issued Jul. 1, 2014 as U.S. Pat. No. 8,764,498,
U.S. patent application Ser. No. 13/424,170, filed Mar. 19, 2012, issued Oct. 6, 2015 as U.S. Pat. No. 9,151,267,
U.S. patent application Ser. No. 13/424,312, filed Mar. 19, 2012,
U.S. patent application Ser. No. 13/536,935, filed Jun. 28, 2012, issued Aug. 19, 2014 as U.S. Pat. No. 8,808,041,
U.S. patent application Ser. No. 13/621,803, filed Sep. 17, 2012, issued Feb. 3, 2015 as U.S. Pat. No. 8,944,866,
International Patent Application PCT/US 2012/029696, filed Mar. 19, 2012,
International Patent Application PCT/US 2012/029718, filed Mar. 19, 2012,
International Patent Application PCT/US 2012/044729, filed Jun. 28, 2012,
International Patent Application PCT/US 2012/055797, filed Sep. 17, 2012,
U.S. Provisional Patent Application No. 60/760,893, filed Jan. 20, 2006,
U.S. Provisional Patent Application No. 60/904,647, filed Mar. 2, 2007,
U.S. Provisional Patent Application No. 60/841,834 filed Sep. 1, 2006,
U.S. Provisional Patent Application No. 60/904,647, filed Mar. 2, 2007,
U.S. Provisional Patent Application No. 61/453,871, filed Mar. 17, 2011,
U.S. Provisional Patent Application No. 61/453,862, filed Mar. 17, 2011,
U.S. Provisional Patent Application No. 61/502,279, filed Jun. 28, 2011,
U.S. Provisional Patent Application No. 61/535,116, filed Sep. 15, 2011,
U.S. Provisional Patent Application No. 61/573,755, filed Sep. 12, 2011,
U.S. Provisional Patent Application No. 61/585,229, filed Jan. 10, 2012, and
U.S. Provisional Patent Application No. 61/600,556, filed Feb. 17, 2012.
The entire disclosure of each of those patents, applications and publications is incorporated herein by reference for all purposes.

BACKGROUND OF THE INVENTION

This invention relates to autonomous water vehicles.

As a wave travels along the surface of water, it produces vertical motion, but no net horizontal motion, of water. The amplitude of the vertical motion decreases with depth; at a depth of about half the wave length, there is little vertical motion. The speed of currents induced by wind also decreases sharply with depth. A number of proposals have been made to utilize wave power to provide useful results. Reference may be made, for example, to the patents and applications incorporated by reference above, and to U.S. Pat. Nos. 986,627, 1,315,267, 2,520,804, 3,312,186, 3,453,981, 3,508,516, 3,845,733, 3,872,819, 3,928,967, 4,332,571, 4,371,347, 4,389,843, 4,598,547, 4,684,350, 4,842,560, 4,968,273, 5,084,630, 5,577,942, 6,099,368 and 6,561,856, U.S. Publication Nos. 2003/0220027 and 2004/0102107, WO 94/10029 and WO 87/04401. The entire disclosure of each of those patents, patent applications and publications is incorporated herein by reference for all purposes.

Liquid Robotics, Inc. has developed particularly useful water vehicles ("Wave Gliders"®), as described for example in U.S. Pat. Nos. 7,641,524 and 8,043,133, which are autonomous (i.e. which do not carry a human being) and which can traverse the oceans for long periods of time under the direction of signals sent to the vehicle from a control location, while gathering useful information which can be communicated to a reception location and/or recorded.

SUMMARY OF THE INVENTION

The term wave-powered vehicle (often abbreviated to WPV) is used in this specification to denote an autonomous water vehicle which comprises
(1) a float which can float on or near the surface of water,
(2) a swimmer,
(3) a flexible or rigid tether connecting the float and the swimmer,
(4) a computer system,
(5) a satellite-referenced position sensor on the float,
(6) a horizontal sensor which senses direction in a horizontal plane,
(7) a steering actuator,
(8) means for converting solar energy and/or wind power anchor wave power into electrical power,
(9) batteries which can be charged by the means for converting solar energy and/or wind power and/or wave power into electrical power, and
(10) communications equipment for receiving and/or sending signals from a remote location, for example a location on land or on another water vehicle;
the computer system (i) being linked to the position sensor, the horizontal sensor and the steering actuator, and (ii) containing, or being programmable to contain, instructions to control the steering actuator in response to signals received from the position sensor and the horizontal sensor or in response to signals received from an additional sensor (i.e. a sensor which is not the position sensor or the horizontal sensor); and the float, swimmer and tether being such that
(A) when the vehicle is in still water and the float is on or near the surface of the water, the swimmer is submerged below the float, and the tether is under tension; and
(B) when the vehicle is in wave-bearing water and the float is on or near the surface of the water, the swimmer interacts with the water to generate forces which move the float in a direction having a horizontal component (hereinafter referred to simply as "in a horizontal direction" or "horizontally").

A WPV can comprise a single one of each of the named components (1)-(10), or two or more of one or more of the named components; for example, there can be two or more floats (as in a catamaran) and/or two or more tethers. The means for converting solar energy and/or wind power and/or wave power into electrical power can for example include one or more of (a) solar panels (photovoltaic (b) a wind mill, and (c) use of forward motion of the vehicle to turn a water mill connected to a generator.

The term UAV is used in this specification to denote an unmanned aerial vehicle (UAVs are often referred to as drones).

In various ways, as described in detail below, this invention makes use of equipment and methods which combine the use of wave powered vehicles and unmanned aerial vehicles (UAVs or drones). A UAV can be launched from a wave-powered vehicle, observe another vessel and report the results of its observation to the wave-powered vehicle and the wave-powered vehicle can report the results of the observation to a remote location. The UAV can land on water and can then be recovered by the wave-powered vehicle.

SUMMARY OF THE DIFFERENT ASPECTS OF THE INVENTION

This invention relates to:

In a first aspect, a float which comprises means for launching a UAV. Some of the floats of the first aspect of the invention are equipped with some or all of the components (4)-(10) listed above. Others are suitable for use in WPVs only after they have been equipped with equipment which makes the float suitable for use in a WPV. Others are designed to be towed behind a WPV.

In a second aspect, a WPV which comprises a float according to the first aspect of the invention.

In a third aspect, a WPV which comprises means for recovering a UAV which is floating in the water.

In a fourth aspect, a float which comprises means for recovering a UAV which is floating in the water. Some of the floats of the fourth aspect of the invention are equipped some or all of the components (4)-(10) listed above. Others are suitable for use in WPVs only after they have been equipped with equipment which makes the float suitable for use in a WPV.

In a fifth aspect, this invention provides a method of monitoring vessels which are floating in water, the method comprising receiving communications from a UAV on the communications equipment of the WPV, and transmitting corresponding communications to a receiving station at a remote location, for example a receiving station on land or on another vessel (including another WPV).

In a sixth aspect, this invention provides a method of monitoring a vessel which is floating in water, the method comprising correlating signals received by a plurality of WPVs to identify the location of the vessel, and launching a UAV from a WPV according to the first aspect of the invention to the location of the vessel.

In a seventh aspect, this invention provides a UAV which, when it lands on water, sinks below the surface of water except for a recovery means which remains above the surface of the water.

In an eighth aspect, this invention provides a UAV which can be converted between (1) a collapsed form in which it can be stowed in a tube and (2) an unfolded form which can operate as a UAV and which the UAV adopts automatically when it is released from the tube.

BRIEF DESCRIPTION OF THE DRAWINGS

The invention is illustrated in the accompanying drawings, which are included by way of example only, and are diagrammatic and not to scale. In the drawings:

in FIG. 2, the tube, which would not normally be transparent, is shown as transparent in the interests of clarity;

DETAILED DESCRIPTION OF THE INVENTION

Figure 1:
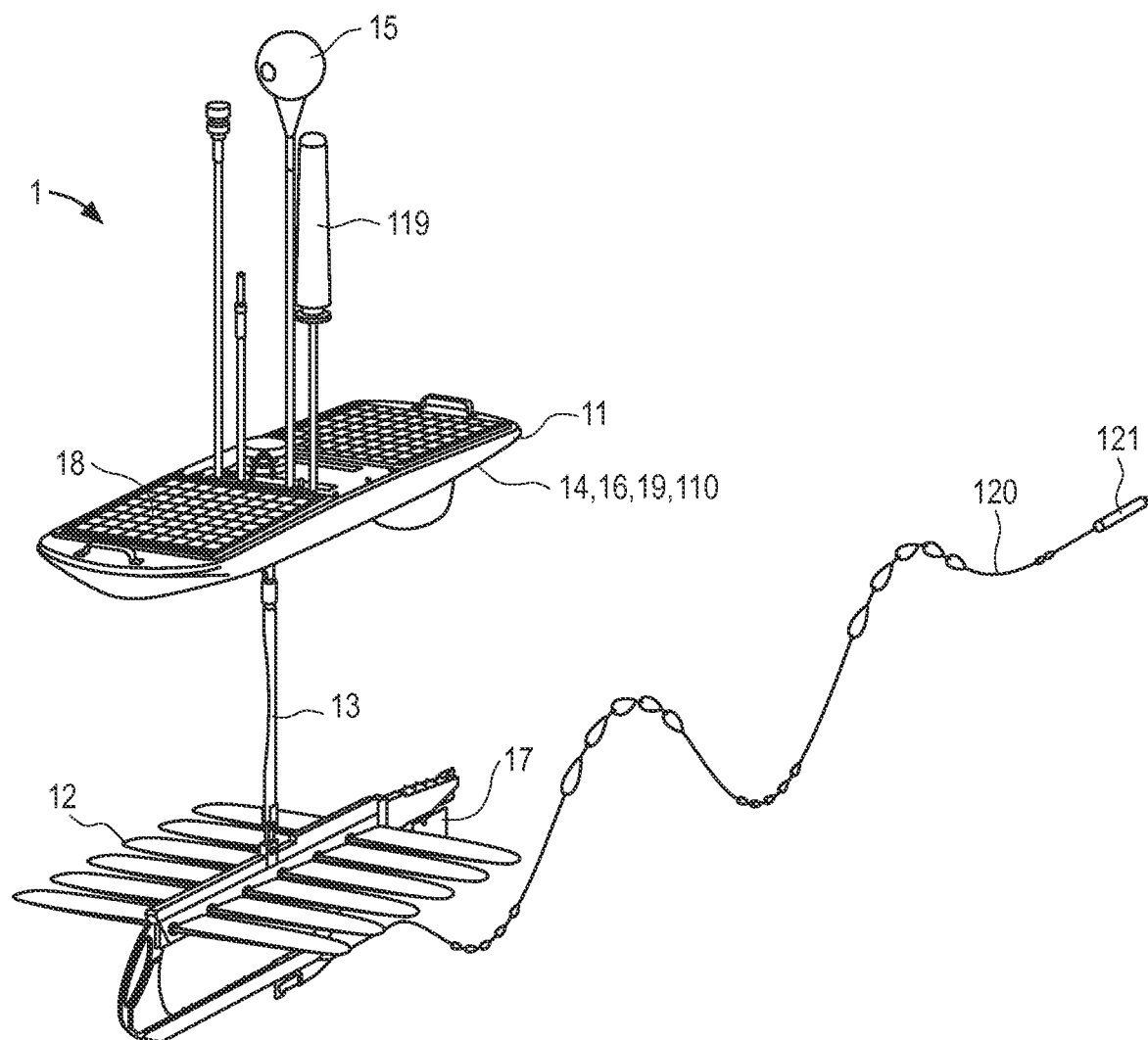
FIG. 1 is a perspective view of a WPV having a recovery cable extending from the swimmer for recovering a UAV which is floating in water.

In the Summary of the Invention above, in the Detailed Description of the Invention below, and in the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect or a particular embodiment, that feature can also be used in combination with other particular aspects and embodiments, and in the invention generally, except where the context excludes that possibility. The invention disclosed herein include embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When a range is given as "(a first number) to (a second number)" or "(a first number)-(a second number)", this means a range whose lower limit is the first number and whose upper limit is the second number. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps, except where the context excludes that possibility. Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function, except where the context excludes that possibility. The numbers given herein should be construed with the latitude appropriate to their context and expression; for example, each number is subject to variation which depends on the accuracy with which it can be measured by methods conventionally used by those skilled in the art.

If any element in a claim of this specification is considered to be, under the provisions of 35 USC 112, an element in a claim for combination which is expressed as a means or step for performing a specified function without the recital of structure, material, or acts in support of thereof, and is, therefore, construed to cover the corresponding structure, material, or acts described in the specification and equivalents thereof, then the corresponding structure, material, or acts in question include such structure, material, or acts described in the US patent documents incorporated by reference herein and the equivalents of such structure, material, or acts.

When reference is made herein to a plan view, a side view, or an end view, or to a cross-section of a float, or to a component of a float being at an angle to the horizontal or to the vertical, the float is being viewed in its normal horizontal position when it is floating on still water (i.e. water which is free from waves).

This specification incorporates by reference all documents referred to herein and all documents filed concurrently with this specification or filed previously in connection with this application, including but not limited to such documents which are open to public inspection with this specification.

(A) The First Aspect of the Invention

The first aspect of the invention is a float which comprises means for launching a UAV. The means for launching the UAV preferably comprises a launch tube which contains a collapsed UAV according to the eighth aspect of the invention or into which a collapsed UAV according to the eighth aspect of the invention can be loaded. The tube contains a mechanism which will eject a collapsed UAV from the tube. The mechanism can for example comprise one or more of a pre-loaded spring, bungee elastic, compressed air, or a pyrotechnic.

In one embodiment, the means for launching the UAV is part of a float which can be connected by a tether to a swimmer and which is optionally equipped with some or all of the components (4)-(10) listed above. In another embodiment, the means for launching the UAV is part of an auxiliary float which is designed to be connected to and pulled behind a float which is part of a WPV. In use, the auxiliary float is connected to the float by a cable. Preferably the cable contains components through which a signal can be sent to the tube(s) on the auxiliary vessel to launch a collapsed UAV from the tube. Alternatively, the tube is equipped with components which can receive a signal from the WPV to launch the UAV.

The tube is set at an angle to the horizontal, for example an angle of 30-60°, e.g., about 45°, so that the UAV is ejected from the tube clear of the water. When the tube is mounted on the WPV itself, it is preferably mounted at the front of the float, so that when the UAV is launched, it does not collide with any antenna or other component above the top surface of the float. When the tube is mounted on an auxiliary float, it can be mounted anywhere on the auxiliary float which ensures that the launched UAV does not collide with any part of the WPV itself, for example pointing directly away from the WPV. The tube can comprise components which compensate for movement of the WPV or auxiliary float away from the horizontal, either purely mechanically or through a combination of mechanical and software components.

There can be a battery of such tubes, e.g., 4-8 tubes. For example, 6 tubes may be arranged 2 wide by 3 deep, all angled at about 45 degrees away from the superstructure on the WPV float, so that the launch path of the drone stays clear of the antennae of the float.

The launch tube is preferably cylindrical and has sealable end caps so that it can keep the drone dry.

(B) The Second Aspect of the Invention

The second aspect of the invention provides a WPV which comprises a float according to the first aspect of the invention. As noted above, the float can be a float which is connected by a tether to a swimmer or an auxiliary float which is towed behind that float.

(C) The Third Aspect of the Invention

The third aspect of the invention is a WPV which comprises means for recovering a UAV, particularly a UAV which is floating in the water. Preferably the WPV is equipped with a recovery cable which can be released (from the float or the swimmer) and which comprises a terminal portion which will float on the surface of the water. The terminal portion has a length of, for example, 10-100 m. After the recovery cable has been released, the WPV is directed to move in a partial or complete circle (or other generally closed figure) around the UAV which is floating in the water. The terminal portion of the recovery cable moves in a corresponding but smaller route, and thus contacts the floating UAV. Having orbited the UAV with its recovery cable sweeping over the UAV, the WPV can continue on its previous heading and a force sensing switch on a winch connected to the recovery cable can detect a successful hook engagement and start the winch. Another sensor could detect the arrival of the UAV at the WPV to stop the winch.

Either or both of the terminal portion and the UAV comprise components which cause the terminal portion and the UAV to be connected to each other. The recovery cable is then reeled in so that the UAV can be secured to the WPV. The amount of information that can be transmitted from an UAV to a WPV (or other receiving station) is less than the amount of information that can be stored on the UAV itself. It is, therefore, useful to be able to recover the UAV, not only to reuse the UAV (if that is possible) but also to recover the information which is stored in it. Thus, data can be collected on flash drives or by cameras or by other sensors on an UAV at much higher rates than can be effectively transmitted via radio links. For example, an UAV can shoot very high resolution video and store it on micro SD cards with many GB capacity. This data may be very valuable to collect, but is very difficult to transmit wirelessly to a WPV because it takes a long time and lots of power to transmit via wifi.

In one embodiment, the recovery cable is ejected from a tube from which an UAV has been ejected, and the recovered UAV is reinstalled in the tube.

In another alternative, the wings of the UAV have hooks on their forward edges. The UAV is deliberately flown into a mast or line projecting from the float of the WPV. The hooks engage the mast or line and the UAV circles around the mast or line until it lands on the float.

The ability to recover the UAV after it has made a crash landing on the water means that the UAV can use nearly all of its battery power on its mission (it doesn't need a reserve to make multiple landing attempts). Weather and sea conditions may be poor, but because the WPV does not run out of power, it can make several attempts (which may take a very long time—months even) to recover the UAV.

(D) The Fourth Aspect of the Invention

The fourth aspect of the invention is a float which comprises means for recovering a UAV which is floating in the water. The means is preferably a recovery cable as disclosed in the discussion of the third aspect of the invention. Some of the floats of the fourth aspect of the invention are equipped with some or all of the components (4)-(10) listed above. Others are suitable for use in WPVs only after they have been equipped with equipment which makes the float suitable for use in a WPV.

(E) The Fifth Aspect of the Invention

The fifth aspect of the invention is a method of monitoring vessels which are floating in water, the method comprising receiving communications from a UAV on the communications equipment of the WPV, and transmitting corresponding communications from the WPV to a receiving station at a remote location, for example a receiving station on land or on another vessel (including another WPV). It is of course possible to make an UAV which will fly over long distances and receive and transmit information from and to distant locations. However, such UAVs are expensive. The present invention makes it possible to employ relatively cheap UAVs, since the UAV is not released until it is relatively close to the target to be observed, and can make use of relatively cheap communications equipment which can supply information to the WPV from which the UAV has been released. A highly effective UAV could comprise low-cost cameras and RC hobby type components, which are rapidly gaining in sophistication and capability. The WPV, which is equipped with more robust communications equipment, can then transmit the information to a distant location.

(F) The Sixth Aspect of the Invention

The sixth aspect of the invention is a method of monitoring a vessel which is floating in water, the method comprising correlating signals received by a plurality of WPVs to identify the location of the vessel, and launching a UAV from a WPV according to the first aspect of the invention to observe the vessel. In this method, two or more WPVs receive signals which indicate the presence of the vessel, and the equipment on the WPVs makes it possible to determine the location of the vessel. Depending upon the signals received by the WPVs, for the vessel may be, for example, 3-40 miles, for example 10-25 miles, from one or both of the WPVs.

Thus, a WPV may carry acoustic sensors that detect the presence and bearing of a target (like an illegal fishing boat or possible smuggler) that may be several miles—perhaps 20 miles away. Multiple wave gliders may work together and from the intersection of two bearing lines, determine the location of a target. Even in foul weather and under the cover of night, cloud and rain, such WPVs could collect acoustic data suggesting the presence and location of a hostile or illegal target in an area that is otherwise difficult to patrol by ship, plane or satellite. Similarly, wave gliders may collect radio signals e.g., from a ship's s radar and determine the bearing of a ship that may be many miles away and even over the horizon. However, it will often be impossible to determine the identity or purpose of such a target from acoustic and RF information alone. This invention makes it possible to send relatively inexpensive UAV to observe the target and obtain further information which can be sent back to the WPV. This is much less expensive and time consuming than investigation by manned water vehicles and/or long range UAVs launched from shore.

For civilian applications in particular (such as Marine Protected Area enforcement), a disposable or single-use UAV would have sufficient capability.

(G) The Seventh Aspect of the Invention

The seventh aspect of the invention is a UAV which, when it lands on water, sinks below the surface of water except for a recovery means which remains above the surface of the water. The recovery means can be a hook or other engagement mechanism. The hook can for example be attached to the front or back of the body of the UAV when the UAV is in-flight, or it can be released only after the UAV has contacted the water. In one embodiment, the UAV, after it has contacted the water, ejects a lifeline which terminates in a buoy which remains on the surface of the water and which can transmit signals to identify its location. Preferably the float comprises means for engaging a line which contacts the float. When the line brushes by the UAV, the hook or other engagement means snaps shut and grips the line. The UAV itself, or the buoy ejected from it, may have a beacon (RF, acoustic or light beacon) or may be able to send a GPS (or similar) message on its location so that the WPV can home in on the UAV.

In one embodiment, a retrieval hook attaches to the inboard, aft corners of each wing root and to the middle of over-center links which maintain the wings are in the correct flying position. As a result, when the hook is pulled forward in the course of the recovery of the UAV, the wings fold backwards together, minimizing the cross section of the UAV. Similarly the propeller folds as soon as the engine stops. Similarly the propeller folds as soon as the engine stops.

Instead of towing a recovery line, the WPV may extend an appendage to one side or the other to capture the UAV.

(H) The Eighth Aspect of the Invention

The eighth aspect of the invention is an UAV which can be converted between (1) a collapsed form in which it can be stowed in a tube and (2) an unfolded form which can operate as a UAV and which the UAV adopts automatically when it is released from the tube. The UAV preferably fits inside a tube which generally, but not necessarily, has a substantially circular cross-section. The wings of the UAV can then fold and stack near the center-line of the tube so that the wing chord length can be maximized for a given diameter of tube. When the UAV is ejected from the tube, a spring (which may be a disposable spring) unfolds the UAV and spreads its wings to their flying configuration, which is maintained by over-center links. [These over-center links may be disabled during recovery of the UAV so that the wings can fold during retrieval]. The propeller automatically unfolds to provide thrust when rotated by a motor which is timed to start after the wings have unfolded. The UAV then navigates towards its first heading and altitude.

In one embodiment, the UAV comprises over-lapping wings that pivot horizontally backwards on the same centerline, vertical axis hinge. The advantage of this design is a reduction in the diameter of the folded package (tube) while maximizing the wing area available. The fact that the wings are vertically displaced by one wing root thickness is of no significant consequence at the low airspeeds on the UAVs which are preferably employed in this invention. Careful fairing of the wing to fuselage shape is preferably employed to minimize parasitic drag at this junction.

In some embodiments, there are downward sloping fins on the wingtips, each having a controllable elevator/rudder that can be moved via control cables from wing root actuators. Such downward sloping fins minimize interference with the tow line and its hooks during retrieval and will help guide the tow line to slide over the UAV until it catches the retrieval hook.

Referring now to the drawings, FIG. 1 shows a WPV 1 comprising a float 11, a swimmer 12 and a tether 13 connecting the float and swimmer. The float includes a satellite-referenced position sensor 15 extending upwards from the float, antenna 119 extending upwards from the float, solar cells 18 exposed on the top of the float, and under the solar cells, and not visible in the FIG., a computer system 14, a horizontal sensor which senses direction in a horizontal plane 16, batteries 19 which can be charged by the solar cells, and communications equipment 110. The swimmer includes a recovery cable 120 having a terminal portion 121 which will float on the surface of water.

Figure 2:
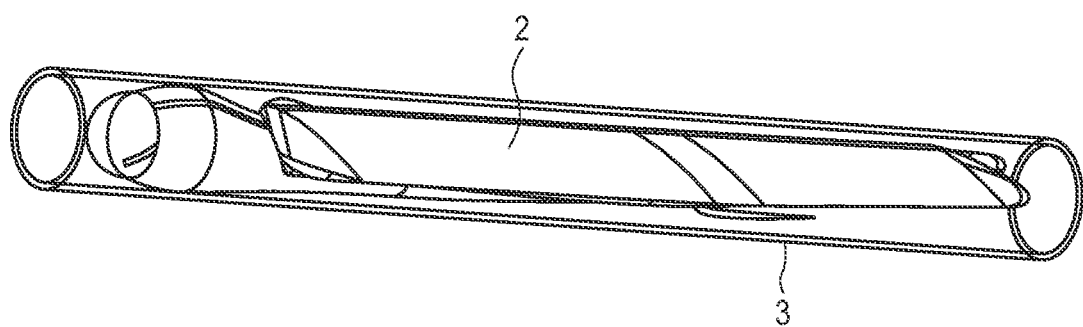
FIG. 2 is a side view of a tube and a UAV in a collapsed form which is stowed in the tube.

FIG. 2 shows a tube 3 with a collapsed UAV 2 within it.

Figure 3A:
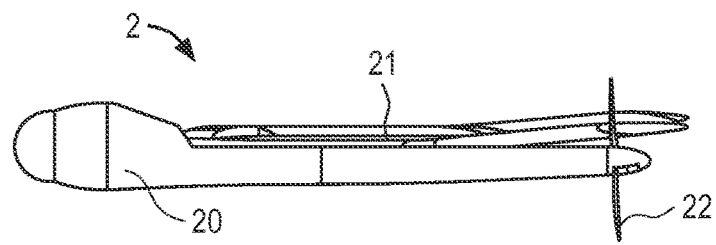
FIG. 3A is a side view.
Figure 3B:
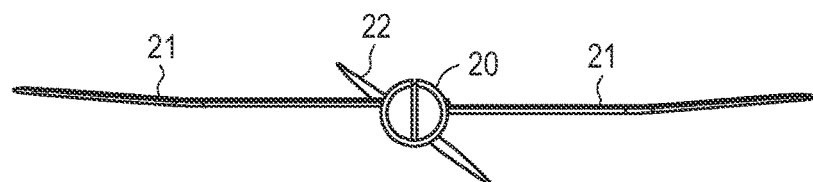
FIG. 3B is a front view.
Figure 3C:
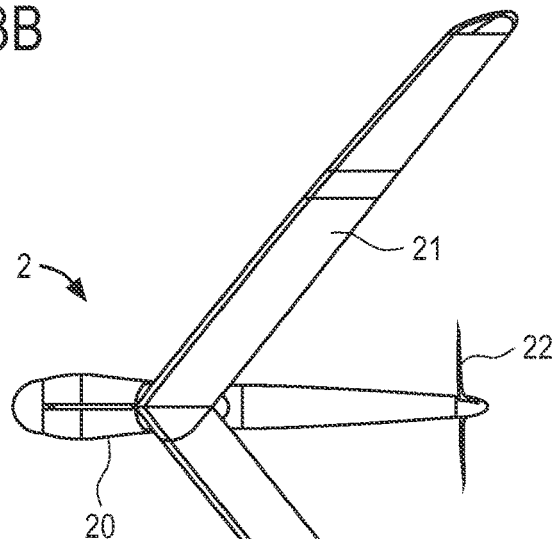
FIG. 3C is a top view.
Figure 3D:
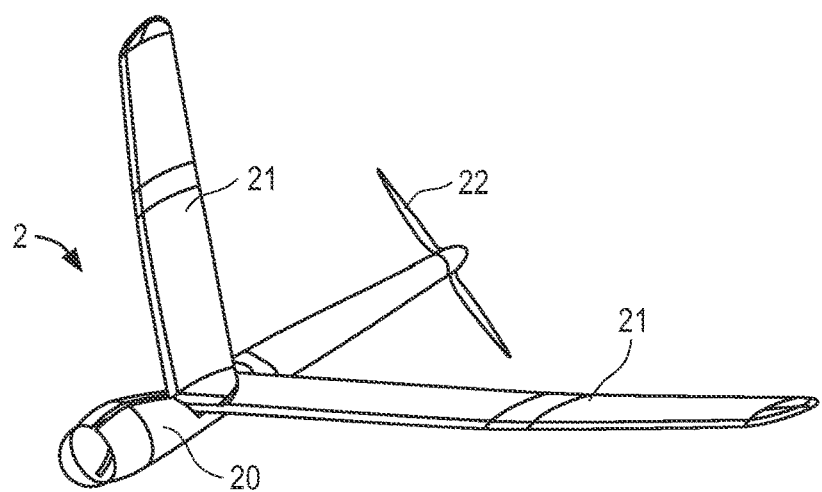
FIG. 3D is a perspective view, of a UAV which has unfolded after being launched from a tube.

FIG. 3A is a side view, FIG. 3B is a front view, FIG. 3C is a top view, and FIG. 3D is a perspective view, of a UAV which has unfolded after being launched from a tube. The UAV comprises wings 21 which have unfolded from the collapsed configuration shown in FIG. 2 in which they are aligned over each other. The UAV also comprises a propeller 22 which has unfolded from the collapsed configuration of the UAV shown in FIG. 2.

Figure 4:
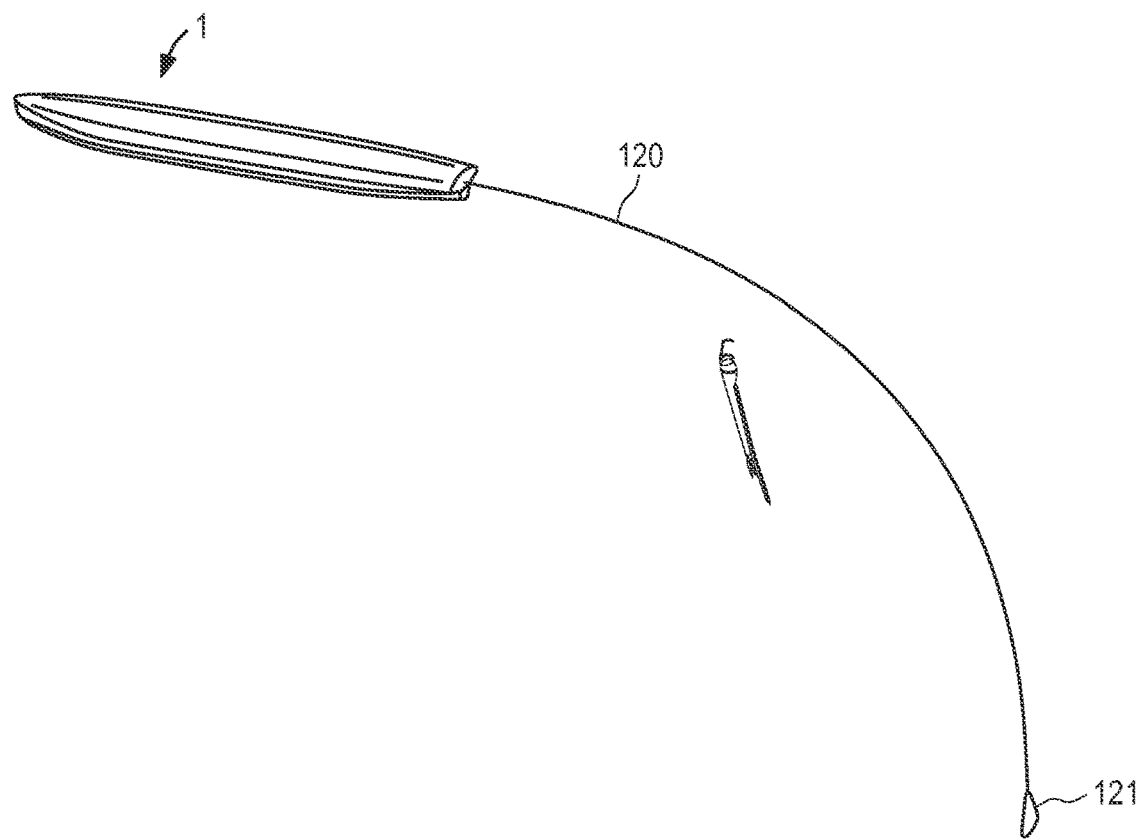
FIG. 4 is a view of a WPV having a recovery cable extending from the float for recovering a UAV.

FIG. 4 shows a float 1 which includes a recovery cable 120 having a terminal portion 121 which will float on the surface of water.

Figure 5:
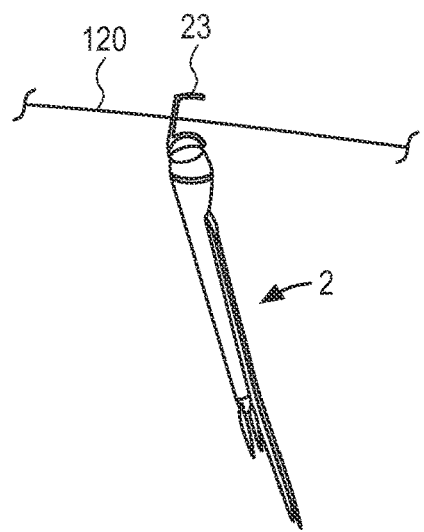
FIG. 5 illustrates how a UAV which has landed in the ocean and which is below the surface of the water except for a hook which can engage a recovery cable extending from a WPV.
Figure 6:
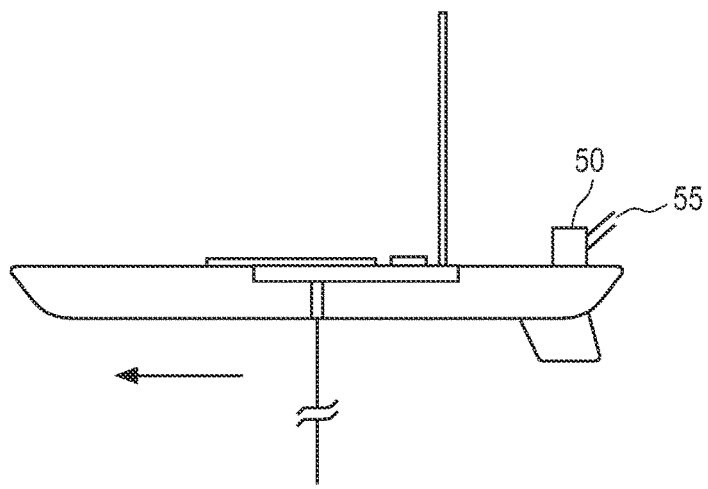
FIG. 6 illustrates a float which can be part of a WPV and which he comprises means for launching a UAV.

FIG. 5 shows a UAV which, after landing in the ocean (for example crash landing after becoming nearly out of batteries), has reverted to a collapsed configuration so that it has sunk below the surface of the water except for a hook 23 which extends above the surface of the water. The UAV is equipped with some communication means (e.g., a recovery beacon or Wi-Fi and GPS) which enables the UAV to be located by a WPV. When contact with the recovery cable 120 is detected, the hook is closed. In FIG. 6, the hook is shown adjacent to, and ready to engage, the recovery cable extending from the WPV, so that the UAV can be recovered by the WPV.

FIG. 6 shows a float which can be part of a WPV and which includes a battery 50 having tubes 55 for launching a collapsed UAV from the float.

Figure 7:
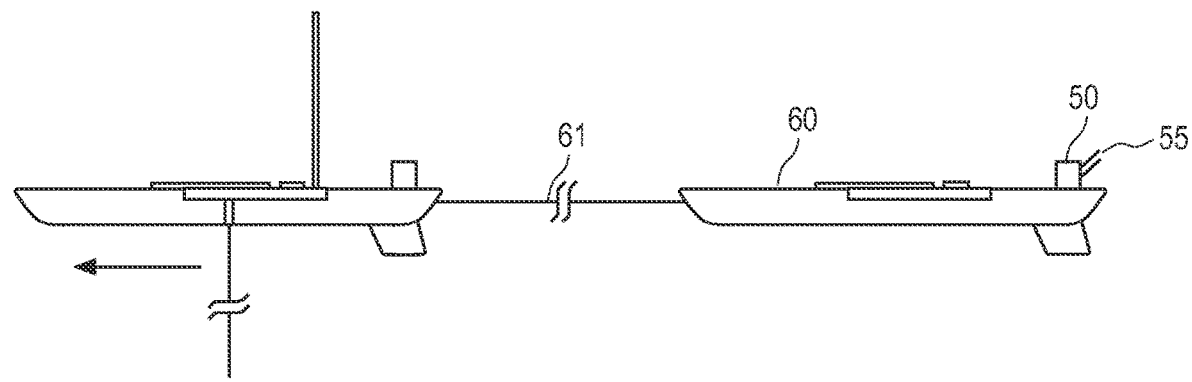
FIG. 7 illustrates a float which can be part of a WPV and an auxiliary float which comprises means for launching a UAV and which is connected to and pulled behind the WPV.

FIG. 7 shows a float which can be part of a WPV, and an auxiliary float 60 which is connected to the WPV by a cable 61 and which includes a battery 50 having tubes 55 for launching a collapsed UAV from the auxiliary float.

What is claimed is:

1. An apparatus comprising:
an unmanned aerial vehicle (UAV);
an autonomous water vehicle (AWV);
a hull that is part of the AWV, or is towed behind the AWV; and
a tube, mounted to the hull, for launching an UAV, wherein:
the UAV, prior to being launched, is in a folded form, and when launched, adopts an unfolded form in which the UAV functions as the UAV,
the UAV comprises a recovery hook which remains above a surface of the water after the UAV lands on water,
means, associated with the AWV, for navigating the AWV to a location where the UAV is in the water; and
a recovery cable, coupled with the AWV, for engaging the recovery hook of the UAV when the UAV is in the water;
wherein the recovery cable is ejected from the tube from which the UAV is launched.

2. The apparatus of claim 1, and further comprising means for providing wave-powered propulsion to the AWV so that the AWV is a wave-powered vehicle (WPV).

3. The apparatus of claim 1, and further comprising:
communications equipment on the AWV for receiving communications from a UAV; and
means, associated with the AWV, for transmitting corresponding communications to a receiving station at a remote location.

4. The apparatus of claim 1, wherein:
the recovery cable comprises a terminal portion that floats on the surface of the water, and
the UAV comprises closing the recovery hook when contact with the recovery cable is detected.

5. The apparatus of claim 4, wherein the AWV further comprises a force sensing switch connected to the recovery cable for detecting a successful engagement of the recovery hook with the recovery cable.

6. The apparatus of claim 5, wherein the AWV comprises a winch for pulling the cable after the force sensing switch detects the successful engagement of the recovery hook with the recovery cable.

7. The apparatus of claim 1, wherein the means for navigating the AWV to the location where the UAV is in the water comprises means for directing the AWV to move in a closed figure around the location of the UAV in the water.

8. An apparatus comprising:
an unmanned aerial vehicle (UAV);
an autonomous water vehicle (AWV);
a hull that is part of the AWV, or is towed behind the AWV;
a launch tube mounted to the hull for storing the UAV in a collapsed form; and
means for ejecting the collapsed UAV from the launch tube whereupon the UAV, when ejected, adopts an unfolded form in which the UAV functions as the UAV;
means for navigating to a location where the UAV is in the water; and
wherein the launch tube comprises means for launching a recovery cable from the AWV, the recovery cable having recovery cable engagement elements and the UAV in the water having cooperating UAV engagement elements allowing at least one of the UAV engagement elements to engage with at least one of the recovery cable engagement elements, thereby rendering the UAV engaged with the recovery cable; and
means for retracting the cable and the engaged UAV to recover the UAV.

9. The apparatus of claim 8, and further comprising elements for providing wave-powered propulsion to the hull.

10. The apparatus of claim 8, wherein:
the recovery cable comprises a terminal portion that floats on a surface of the water, and
the UAV engagement elements comprises a recovery hook.

11. The apparatus of claim 6, wherein:
the UAV closes the recovery hook when contact with the recovery cable is detected.

12. The apparatus of claim 11, wherein the AWV further comprises a force sensing switch connected to the recovery cable for detecting a successful engagement of the recovery hook with the recovery cable.

13. The apparatus of claim 12, wherein the AWV comprises a winch for pulling the cable after the force sensing switch detects the successful engagement of the recovery hook with the recovery cable.

14. The apparatus of claim 8, wherein the means for navigating to a location where the UAV is in the water comprises means for directing the AWV to move in a closed figure around the location of the UAV in the water.

15. A method performed by an autonomous water vehicle (AWV) and an unmanned aerial vehicle (UAV) the method comprising:
the AWV launching the UAV into flight from a launch tube;
the UAV gathering information while flying;
the UAV landing in the water;
the UAV and the AWV communicating so that the AWV can determine a location where the UAV landed in the water;
the AWV navigating to the location;
the AWV moving in a closed figure around the location of the UAV in the water until a force sensing switch connected to a recovery cable ejected from the launch tube detects a successful engagement of a UAV recovery means with the recovery cable; and
the AWV recovering the UAV.

16. The method of claim 15 wherein the AWV is a wave-powered vehicle (WVP).

17. An apparatus comprising an autonomous water vehicle (AWV) and an unmanned aerial vehicle (UAV) wherein:
the AWV comprises,
a hull that is part of the AWV or towed behind the AWV,
means for navigating to a desired location,
a launch tube mounted to the hull for storing the UAV in a collapsed form,
means for ejecting the collapsed UAV from the launch tube whereupon the UAV, when ejected, adopts an unfolded form in which the UAV functions as the UAV, and
a recovery cable for recovering the UAV after the UAV lands in the water, the recovery cable ejected from the launch tube and having a floating terminal portion; and
the UAV comprises,
means for gathering information during the UAV's flight,
means for communicating information to the AWV regarding the UAV's location when the UAV has landed in the water, thereby allowing the AWV to approach the UAV; and
means for engaging the recovery cable when the AWV approaches the UAV.

18. The apparatus of claim 17 wherein the AWV includes a swimmer and a tether, such that when the AWV is in wave-bearing water, the swimmer is submerged at an end of the tether and interacts with the water to generate forces which move the AWV in a direction having a horizontal component.

19. The apparatus of claim 17, wherein the means for engaging the recovery cable comprises a recovery hook.

20. The apparatus of claim 19, wherein the UAV closes the recovery hook when contact when the recovery cable is detected.

21. The apparatus of claim 20, wherein the AWV further comprises a force sensing switch connected to the recovery cable for detecting a successful engagement of the recovery hook with the recovery cable.

22. The apparatus of claim 21, wherein the AWV comprises a winch for pulling the cable after the force sensing switch detects the successful engagement of the recovery hook with the recovery cable.

* * * * *